United States Patent
Neumann

(10) Patent No.: US 10,228,200 B2
(45) Date of Patent: Mar. 12, 2019

(54) INSTALLATION ELEMENT FOR USE IN THE FIELDS OF COOLING TECHNOLOGY, WATER TREATMENT OR MASS TRANSFER AND METHOD FOR THE MANUFACTURE OF SUCH AN INSTALLATION ELEMENT

(71) Applicant: GEA 2H WATER TECHNOLOGIES GMBH, Wettringen (DE)

(72) Inventor: Ingo Neumann, Hamm (DE)

(73) Assignee: ENEXIO WATER TECHNOLOGIES GMBH, Wettringen (DE)

( * ) Notice: Subject to any disclaimer, the term of this patent is extended or adjusted under 35 U.S.C. 154(b) by 165 days.

(21) Appl. No.: 15/129,196

(22) PCT Filed: Mar. 24, 2015

(86) PCT No.: PCT/EP2015/056277
§ 371 (c)(1),
(2) Date: Sep. 26, 2016

(87) PCT Pub. No.: WO2015/144716
PCT Pub. Date: Oct. 1, 2015

(65) Prior Publication Data
US 2017/0108298 A1    Apr. 20, 2017

(30) Foreign Application Priority Data

Mar. 26, 2014 (DE) .................. 10 2014 104 162

(51) Int. Cl.
*C02F 3/10* (2006.01)
*C02F 3/00* (2006.01)
(Continued)

(52) U.S. Cl.
CPC ............... *F28F 25/08* (2013.01); *C02F 3/00* (2013.01); *C02F 3/108* (2013.01); *C02F 3/109* (2013.01);
(Continued)

(58) Field of Classification Search
CPC ... B29C 47/06; B29C 66/438; F28D 21/0015; F28D 9/0062; F28D 5/00; F28F 25/087;
(Continued)

(56) References Cited

U.S. PATENT DOCUMENTS 4,657,614 A * 4/1987 Andersson .............. B32B 15/08
156/244.11
5,248,454 A * 9/1993 Thomas .................... B01J 19/32
261/112.2
(Continued)

FOREIGN PATENT DOCUMENTS

DE    10357307    7/2005
DE    102005041846    3/2007
(Continued)

OTHER PUBLICATIONS

International Search Report, dated Jul. 7, 2015, priority document.

*Primary Examiner* — Claire A Norris
(74) *Attorney, Agent, or Firm* — Greer, Burns & Crain, Ltd.

(57) ABSTRACT

An installation element for use in cooling technology, in water treatment, or in mass transfer and a method for producing such an element. The installation element is sell supporting and is composed of a plurality of plies which are at least partially spatially structured and which are connected to each other. Adjacent plies form flow paths for a liquid and/or a gaseous medium between the adjacent plies. The installation element has at least some of the plies being composed of an at least three-layer coextruded plastic film, a center layer of the three-layer plastic film being a mechanically supporting layer, and the two outer layers are composed of a plastic having application-specific properties or are layers each having at least one additive which is added to the plastic and which gives application specific properties to the outer layers.

16 Claims, 1 Drawing Sheet

(51) Int. Cl.
*F28D 9/00* (2006.01)
*F28D 21/00* (2006.01)
*F28F 25/08* (2006.01)
*C02F 103/02* (2006.01)

(52) U.S. Cl.
CPC ....... *F28D 9/0031* (2013.01); *F28D 21/0015* (2013.01); *C02F 2103/023* (2013.01); *C02F 2303/04* (2013.01); *C02F 2305/04* (2013.01); *F28F 2265/20* (2013.01); *Y02W 10/15* (2015.05)

(58) Field of Classification Search
CPC .... F28F 13/18; F28F 19/04; F28F 1/16; F28F 25/08; F28F 1/26; F28F 21/065; F28F 2255/16; B29D 7/01; C02F 3/201
USPC .............. 210/615; 261/112.2; 165/166, 133; 264/112
See application file for complete search history.

(56) References Cited

U.S. PATENT DOCUMENTS

| 6,544,628 | B1* | 4/2003 | Aull | .......................... B01J 19/32 |
| | | | | 261/110 |
| 2003/0203183 | A1* | 10/2003 | Hester | .................... B01D 61/00 |
| | | | | 428/315.5 |
| 2010/0015385 | A1 | 1/2010 | Woicke | |
| 2010/0032145 | A1 | 2/2010 | Lee | |
| 2014/0014289 | A1* | 1/2014 | Tan | ....................... F28D 9/0025 |
| | | | | 165/10 |
| 2014/0057081 | A1* | 2/2014 | Rothen | .................... B29D 7/01 |
| | | | | 428/161 |
| 2014/0326432 | A1 | 11/2014 | Dean et al. | |

FOREIGN PATENT DOCUMENTS

| DE | 102006061043 | 6/2008 |
| DE | 102008004186 | 7/2008 |
| EP | 1538398 | 6/2005 |
| WO | 2008088159 | 7/2008 |
| WO | 2013091099 | 6/2013 |

* cited by examiner

INSTALLATION ELEMENT FOR USE IN THE FIELDS OF COOLING TECHNOLOGY, WATER TREATMENT OR MASS TRANSFER AND METHOD FOR THE MANUFACTURE OF SUCH AN INSTALLATION ELEMENT

CROSS-REFERENCES TO RELATED APPLICATIONS

This application claims the benefit of the German patent application No. 10 2014 104 162.3 filed on Mar. 26, 2014, the entire disclosures of which are incorporated herein by way of reference.

BACKGROUND OF THE INVENTION

The invention relates to an installation element for use in the fields of cooling technology, water treatment or mass transfer, wherein the installation element is self-supporting and is composed of a plurality of plies which are, at least in part, structured spatially and are connected to each other, wherein neighboring plies form between themselves flow paths for a liquid and/or for a gaseous medium.

In addition, the invention relates to a method for the manufacture of such an installation element.

Known from DE 103 57 307 A1 is a contact body, in particular for an evaporative humidifier, wherein the contact body is composed of a plurality of plies which are, at least in part, structured spatially and are connected to each other, wherein neighboring plies form between themselves flow paths that are permeable to air, wherein, on the one hand, the contact body can be loaded with water to be evaporated and, on the other hand, an air current can flow through the contact body with the air being humidified and cooled. In a first embodiment, two types of plies are provided in the contact body, wherein a first type of plies consists of a self-supporting material and a second type of plies consists of an absorbent non-supporting material. The material forming the second type of plies can be laminated to one ply each of the first type, either on one side or on both sides. In a second embodiment, the material forming the plies is a molded geotextile or a molded non-woven fabric or a molded porous plastic material. Preferably, a supporting additive material is mixed or inserted into the geotextile or non-woven fabric, wherein said additive material can be mechanically and/or thermally molded or is liquid initially and can be hardened in a forming mold. Here, the plastic material preferably is a plastic material that forms open pores and can be thermally expanded while it is being molded by adding an expanding additive beforehand. As regards the prior art, this document also mentions that an antibacterially acting additive can be embedded in and/or applied to the material(s) of the plies.

This prior art is considered to be disadvantageous in that the contact body either is complex in its manufacture when different materials are laminated to each other, or comprises a relatively low mechanical stability when a geotextile or non-woven fabric or expanded plastic is used as material for the plies.

SUMMARY OF THE INVENTION

An object of the present invention therefore is to create an installation element of the aforementioned type, which obviates the drawbacks of the prior art and which can, in particular, be produced cost-effectively, which can be given application-specific properties at low expenditure, and which comprises a high mechanical stability and long durability when being in use.

The part of the object that relates to the installation element can be resolved according to the invention by means of an installation element of the aforementioned type, said installation element being characterized in that at least some of the plies are composed of an at least three-layer coextruded plastic film, that a central layer of the three-layer plastic film is a mechanically supporting plastic layer, and that the two outer layers of the three-layer plastic film either comprise a plastic material that comprises application-specific properties or are plastic layers each comprising at least one additive that is added to the plastic material and gives the outer layers application-specific properties.

Since, according to the invention, the plies comprise a three-layer system or even more layers, various properties and functions can be assigned to the different layers, with each layer being optimized for said properties and functions. By means of coextrusion, the films for the plies of the installation element can be produced relatively easily and quickly, with the result that large quantities of installation bodies can be produced in a highly economical manner. In particular, the outer layers can comprise a higher-quality plastic material having specific properties that are desired or required for the respective case of application, more particularly surface properties and/or biological or chemical properties, whereas the central layer comprises a current and cost-effective plastic material. This is to advantage in that what counts in the aforementioned applications often are surface properties of the plies of the installation element, with the result that the central layer mainly provides mechanical stability but does not have to fulfill any other special properties. The plastic materials having the addressed specific surface properties or biological or chemical properties, however, are relatively expensive, with the result that the use of these plastic materials over the entire thickness of the plies, as it has so far been customary in practice, only resulted in products that could only be sold to a limited extent. This drawback is completely overcome and obviated by means of the present invention.

All layers of the coextruded film can comprise the same basic plastic material, wherein the basic plastic material in the central layer is, preferably, used in its pure form while, in the outer layers, it is, e.g., provided with the additives or aggregates producing the desired specific properties. The layers of the coextruded film can also comprise different basic plastic materials as long as the plastic materials can be processed during coextrusion to form the three- or multiple-layer film.

In order to give the installation element according to the invention properties that are suitable and optimal for the relevant cases of its use, it is, in particular, provided that the additive is a substance that is antibacterial or promotes microbial growth or is flame-retardant or lowers the surface tension or increases the resistance. Depending on the conditions of use of the installation element, it is also possible to generate a property by a single additive. However, it is also possible to use a plurality of different additives to generate a plurality of desired properties at the same time. The exact type and dosage of the respective additive is selected by the person skilled in the art based on his or her specialized knowledge because he or she knows additives suitable for reaching certain desired plastic properties as such. If necessary, it is also possible to run relatively simple tests for selecting the best suitable additives and their optimal dosage. For example, silver ions are an antibacterially acting additive that is known as such.

With regard to the requirements set for the installation element according to the invention that have to be met during its production and its use, the plastic material for the coextruded films to form the plies preferably is polypropylene (PP) or polyvinyl chloride (PVC) or polyethylene (PE) or polyvinylidene fluoride (PVDF).

A particularly economic production of the installation element is achieved if, as is preferably provided, the central layer of the three-layer coextruded plastic film comprises a thickness which amounts to at least 50 percent, preferably at least 70 percent, of the thickness of the complete ply. Half or more of the film therefore comprises the cost-effective simple basic plastic material.

In order to design the installation element as stable and durable as possible and with a weight that is as low as possible, the central layer of the three-layer coextruded plastic film can contain a mechanical reinforcement material, preferably talcum or glass fibers or carbon fibers. By means of such an additive, the central layer can be implemented with a reduced material thickness while maintaining the same mechanical stability, with the result that material and weight are advantageously saved.

In a more concrete embodiment, the installation element is a cooling tower or air humidifier installation element, and the outer layers of the three-layer coextruded plastic film comprise as an application-specific property an antibacterial property and/or a property that lowers the surface tension. What is achieved with the antibacterial property is, e.g., that the development and release of *Legionella* or other disturbing or dangerous microorganisms are prevented. The property lowering the surface tension ensures that the plies of the installation element are well moistened with the liquid flowing through the installation element and secures a high efficiency of the installation element in terms of heat exchange or air moistening.

In a further concrete embodiment, the installation element is a sewage purification plant or fish farm installation element, and the outer layers of the three-layer coextruded plastic film comprise as an application-specific property a property that promotes a growth of pollutant degrading microorganisms. The property desired in this case particularly is a surface structure of the plies that provides firm hold for the growth. A further property favorable in this case can be an additional nutrient supply for the growth.

In a further concrete embodiment, the installation element is a mass transfer device installation element, and the outer layers of the three-layer coextruded plastic film comprise as an application-specific property a property that increases the chemical resistance to the media entering into an exchange of materials in the installation element. For example, the materials entering into an exchange of materials may be chemically corroding. By appropriately selecting the basic plastic material and/or the additives, the outer layers of the plies will then be made resistant to these influences wherein, here as well, the person skilled in the art selects the appropriate basic plastic materials and additives based on his or her specialized knowledge.

In order to give the installation a good mechanical stability while it is produced in a simple and economic manner, the individual plies or previously formed ply packages of the installation element are preferably connected to each other occasionally, more particularly welded or glued or mechanically clipped.

The solution of the part of the object relating to the method for producing an installation element is achieved according to the invention by means of a method which is characterized in that at least some of the plies are produced by means of coextrusion in the form of an at least three-layer plastic film, that a central layer of the three-layer plastic film is produced as a mechanically supporting plastic layer, and that the two outer layers of the three-layer plastic film either are produced from a plastic material that comprises application-specific properties or are produced in the form of plastic layers each comprising at least one additive that is added to the plastic material and gives the outer layers application-specific properties.

Installation elements of the aforementioned type having the desired application-specific properties can be produced in an economical manner with the method according to the invention.

It is further provided for the method according to the invention that, after extrusion, the three-layer plastic film is continuously supplied to a forming tool as a film web, with the film web being continuously formed in said forming tool to form a spatial structure, that sections are cut off the film web subsequent to a cooling process fixing the forming, and that, in each case, a plurality of sections or section packages are connected to each other to form an installation element or installation element block. This method embodiment provides continuous production, allowing large quantities of installation elements to be produced in a cost-effective manner.

As an alternative, a method embodiment is suggested that is characterized in that the three-layer plastic film is cooled down and cut into sections after extrusion, that the sections are supplied to a forming tool intermittently, with the film web being formed in said forming tool to form a spatial structure by thermoforming, and that, in each case, a plurality of sections or section packages are connected to each other to form an installation element or installation element block subsequent to a cooling process fixing the forming. Here, the production is intermittent, allowing semifinished products which are unformed and formed film sections in this case to be intermediately stored and to be treated and processed only as and when needed or after having been transported to another location.

Finally, a refinement of the two method embodiments last described provides, according to the invention, that the installation element blocks are produced in a size that is in excess of the size of the installation elements and that subsequently installation elements having the desired dimensions are cut off or out of the installation element blocks. Therein, the installation element blocks preferably have a size that corresponds to an integer multiple of the size of an installation element, in order to avoid refuse and waste.

BRIEF DESCRIPTION OF THE DRAWINGS

Below, an exemplary embodiment of the invention will be illustrated by means of a drawing. In the drawing.

DETAILED DESCRIPTION OF THE PREFERRED EMBODIMENTS

Figure 1:
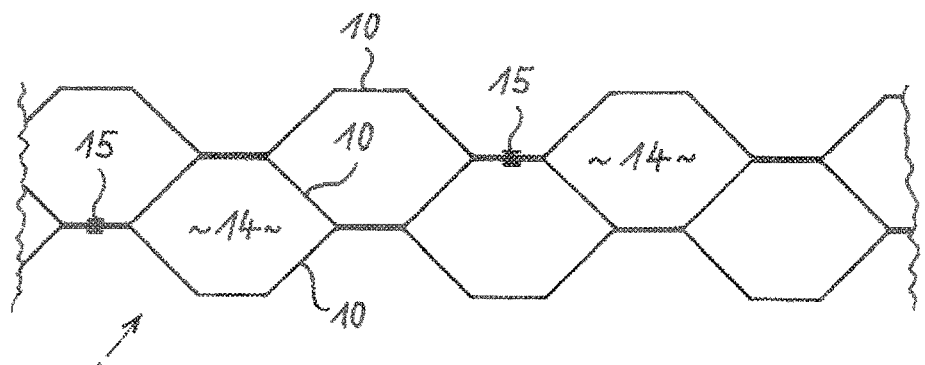
FIG. 1 is a view of one of the front faces of the plies, showing a detail of an installation element consisting of a plurality of plies.

FIG. 1 of the drawing is a view of one of the front faces of the plies, showing a detail of an installation element 1 comprising a plurality of plies 10, wherein, in the illustrated instance, only three plies 10 are shown; in practice, the number of plies 10 is considerably higher in a customary installation element 1.

The individual plies 10 each comprise a plastic film having a wavy form wherein, in the illustrated instance, the waves are staggered in relation to each other such that this alternately results in regions in which two plies 10 abut against each other and regions in which the two plies 10 form between themselves flow paths 14 for one medium or a plurality of media flowing through the installation element 1 while it is in use.

In the regions of two plies 10 that abut against each other, these plies 10 are connected, for example, welded or glued or mechanically clipped, to each other by means of connection points 15 in sufficient number and appropriate distribution and density. The connected plies 10 then form an installation element 1 that has, e.g., the shape of a cuboid and is stable to such an extent that it forms a self-supporting body.

The waves in the plies 10 can be aligned at a right angle to the front edge of the plies 10 that is facing the viewer or at a slanted angle thereto. Therein, the waves of neighboring plies 10 can extend in parallel or such that they intersect each other.

Figure 2:
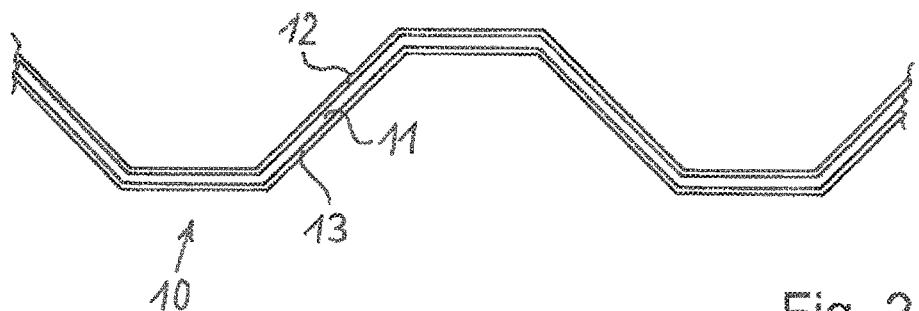
FIG. 2 shows an enlarged detail of a three-layer ply of the installation element shown in FIG. 1.

FIG. 2 shows a detail of a ply 10 of the installation element 1 shown in FIG. 1 in an enlarged view. In the illustrated instance, the ply 10 comprises a plastic film comprising three layers 11, 12 and 13 and is produced by means of coextrusion.

The central layer 11 comprises a customary plastic material which does not have to comprise special properties and, in essence, forms the supporting part of the ply 10. Here, plastic materials such as polypropylene (PP) or polyvinyl chloride (PVC) or polyethylene (PE) or polyvinylidene fluoride (PVDF) are particularly suitable.

An outer layer 12, 13 which also comprises plastic is arranged on either side of the central layer 11, wherein however said plastic, contrary to the central layer 11, either comprises special application-specific properties by itself or is given application-specific properties by one or a plurality of additives.

Depending on the use of the installation element 1, different application-specific properties are desired or required.

When the installation element 1 is used in a cooling tower, for example, an antibacterial property of the outer layers 12, 13 is desired in order to prevent a multiplication and release of dangerous microorganisms, such as *Legionella*. An antibacterially acting additive that is suitable in this case are, for example, silver ions. What is often also desired in the same case of application, is a property of the outer layers 12, 13 of the plies 10, which lowers the surface tension of the liquids flowing across the plies 10, wherein said property can be achieved by means of one or a plurality of additives generating the corresponding property.

When the installation element 1 is used as a sewage purification plant or fish farm installation element, it is desired that the outer layers 12, 13 of the three-layer coextruded plastic film comprise, as an application-specific property, a property that promotes a growth of pollutant degrading microorganisms. To achieve this, the property can, e.g., be a certain surface roughness for a firm hold of the microorganisms to be colonized and/or a nutrient supply that is limited in time and helpful at least in a starting phase of the colonization with microorganisms.

When the installation element 1 is a mass transfer installation element, then the outer layers 12, 13 of the three-layer coextruded plastic film appropriately comprise, as an application-specific property, a property that increases the chemical resistance to the media entering into an exchange of materials in the installation element. Since the central layer of the three-layer coextruded plastic film is covered by the two outer layers and therefore does not come into contact with the possibly aggressive media, the central layer does not have to comprise an increased resistance.

Figure 3:
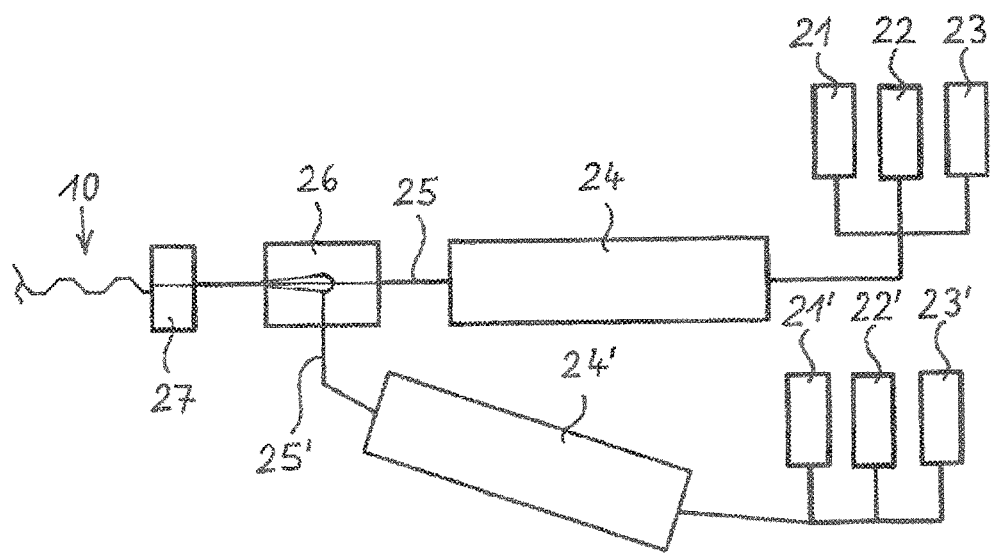
FIG. 3 is a schematic diagram of an extruder arrangement for coextrusion of three-layer plastic films for the plies of the installation element.

Finally, FIG. 3 is a schematic diagram of an extruder arrangement for coextrusion of three-layer plastic films for the plies 10 of the installation element 1.

On the right of FIG. 3, two groups each with three storage tanks 21, 22 and 23 or 21', 22' and 23', respectively, are shown, which are used to provide plastic granules as well as additives for coextrusion of the films. The storage tanks 21, 22 and 23 are connected to a first screw conveyor 24 via conveying and metering equipment that is not shown here, with a plasticized plastic mass being produced in said screw conveyor 24. The storage tanks 21', 22' and 23' are connected to a second screw conveyor 24' via conveying and metering equipment that is not shown here either, with a plasticized plastic mass being produced in said screw conveyor 24' as well, wherein, if necessary, additives generating certain desired properties are added.

The plasticized plastic masses are each supplied through a feed channel 25 or 25', respectively, to a common extrusion nozzle 26 by means of the screw conveyors 24 and 24', with the film forming the plies 10 with its three layers 11, 12 and 13 being generated by coextrusion. To achieve this, the plasticized plastic mass is, in the nozzle 26, supplied from the second screw conveyor 24' in the form of a flat strand to the upper side and lower side of the plasticized plastic mass that is released from the first screw conveyor 24 in the form of a flat strand as well, in order to generate in this manner the three-layer coherent film by the coextrusion thereof.

After it has left the nozzle 26, the three-layer film is fed through a forming tool 27 to give the film the desired spatial structure, which is waviness in the illustrated instance.

After the film web has cooled down and has been cut to film web sections, the plies 10 thus generated can be arranged one on top of the other and connected to each other to form the installation element 1 according to FIG. 1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMBERS

| Number | Designation |
| --- | --- |
| 1 | Installation element |
| 10 | Plies of 1 |
| 11 | Central layer of 10 |
| 12, 13 | Outer layers of 10 |

-continued

| Number | Designation |
| --- | --- |
| 14 | Flow paths in 1 |
| 15 | Connection points in 1 |
| 2 | Extruder arrangement |
| 21, 22, 23 | First storage tanks |
| 21', 22', 23' | Second storage tanks |
| 24, 24' | Screw conveyors |
| 25, 25' | Feed channels |
| 26 | Extrusion nozzle |
| 27 | forming tool |

The invention claimed is:

1. An installation element for use in the fields of cooling technology, water treatment or mass transfer, wherein the installation element is self-supporting and is composed of a plurality of individual plies which are, at least in part, structured spatially and are connected to each other, wherein neighboring plies form flow paths between themselves for at least one of a liquid or a gaseous medium, wherein
at least some of the individual plies are entirely composed of an at least three-layer coextruded and self-coherent plastic film,
a central layer of the three-layer plastic film is a mechanically supporting plastic layer, and
the two outer layers of the three-layer plastic film comprise one of a plastic material that comprises application-specific properties or are plastic layers each comprising at least one additive that is added to the plastic material and gives the outer layers application-specific properties.

2. The installation element according to claim 1, wherein the two outer layers each comprise at least one additive and the at least one additive is a substance that is one of antibacterial, promotes microbial growth, is flame-retardant, lowers the surface tension or increases the resistance.

3. The installation element according to claim 1, wherein the plastic material is one of polypropylene (PP), polyvinyl chloride (PVC), polyethylene (PE) or polyvinylidene fluoride (PVDF).

4. The installation element according to claim 1, wherein the central layer of the three-layer coextruded plastic film comprises a thickness which amounts to at least 50 percent of the thickness of the plies comprising the three-layer coextruded plastic film.

5. The installation element according to claim 1, wherein the central layer of the three-layer coextruded plastic film contains a mechanical reinforcement material.

6. The installation element according to claim 1, for use in a cooling tower or air humidifier installation, and wherein the outer layers of the three-layer coextruded plastic film comprise, as an application-specific property, at least one of an antibacterial property or a property that lowers the surface tension.

7. The installation element according to claim 1, for use in a sewage purification plant or fish farm installation, and wherein the outer layers of the three-layer coextruded plastic film, comprise as an application-specific property, a property that promotes a growth of pollutant degrading microorganisms.

8. The installation element according to claim 1, for use in a mass transfer device installation, and wherein the outer layers of the three-layer coextruded plastic film comprise, as an application-specific property, a property that increases chemical resistance to the media entering into an exchange of materials in the installation element.

9. The installation element according to claim 1, wherein the individual plies of the installation element are connected to each other occasionally.

10. The installation element according to claim 9, wherein the individual plies of the installation element are connected to each other by being one of welded, glued or mechanically clipped.

11. A method for producing an installation element for use in the fields of cooling technology, water treatment or mass transfer, wherein the installation element is self-supporting and comprises:
a plurality of individual plies which are, at least in part, structured spatially and are connected to each other, wherein neighboring plies form flow paths between themselves for at least one of a liquid or a gaseous medium, wherein
at least some of the individual plies are entirely composed of an at least three-layer coextruded plastic film,
a central layer of the three-layer plastic film is a mechanically supporting plastic layer, and
the two outer layers of the three-layer plastic film comprise one of a plastic material that comprises application-specific properties or are plastic layers each comprising at least one additive that is added to the plastic material and gives the outer layers application-specific properties, the method comprising the steps:
producing at least some of the plies in the form of the at least three-layer plastic film by means of coextrusion,
producing a central layer of the three-layer plastic film as a mechanically supporting plastic layer, and
producing the two outer layers of the three-layer plastic film either from a plastic material that comprises application-specific properties or generating the two outer layers in the form of plastic layers, each comprising at least one additive that is added to the plastic material and gives the outer layers application-specific properties.

12. The method according to claim 11, comprising a further step of, after extrusion, continuously supplying the three-layer plastic film to a forming tool as a film web, with the film web being continuously formed in said forming tool to form a spatial structure, wherein sections are cut off the film web subsequent to a cooling process fixing the forming, and wherein, in each case, a plurality of sections or section packages are connected to each other to form the installation element or an installation element block.

13. The method according to claim 11, wherein the three-layer plastic film is cooled down and cut into sections after extrusion, wherein the sections are supplied to a forming tool intermittently, with the film web being formed in said forming tool to form a spatial structure by thermoforming, and wherein, in each case, a plurality of sections or section packages are connected to each other to form the installation element or an installation element block subsequent to a cooling process fixing the forming.

14. The method according to claim 12, wherein the installation element blocks are produced in a size that is in excess of the size of the installation elements and wherein subsequently installation elements having the desired dimensions are cut off or out of the installation element blocks.

15. The method according to claim 13, wherein the installation element blocks are produced in a size that is in excess of the size of the installation elements and wherein subsequently installation elements having the desired dimensions are cut off or out of the installation element blocks.

16. An installation element for use in the fields of cooling technology, water treatment or mass transfer, wherein the installation element is self-supporting and is composed of a plurality of individual plies which are, at least in part, structured spatially and are connected to each other, wherein neighboring plies form flow paths between themselves for at least one of a liquid or a gaseous medium, wherein at least some of the individual plies are entirely composed of an at least three-layer coextruded plastic film, the at least three layers each extending across an entire length and width of the film and together having a wavy form, a central layer of the three-layer plastic film is a mechanically supporting plastic layer, and the two outer layers of the three-layer plastic film comprise one of a plastic material that comprises application-specific properties or comprise plastic layers each comprising at least one additive added to the plastic material and giving the outer layers application-specific properties.

* * * * *